March 6, 1945.    B. T. WAGERS    2,371,005
INTERNAL-COMBUSTION ENGINE
Filed Sept. 9, 1941    5 Sheets-Sheet 1

FIG. 1.

INVENTOR
Beverly T. Wagers
By Mason & Porter
ATTORNEYS

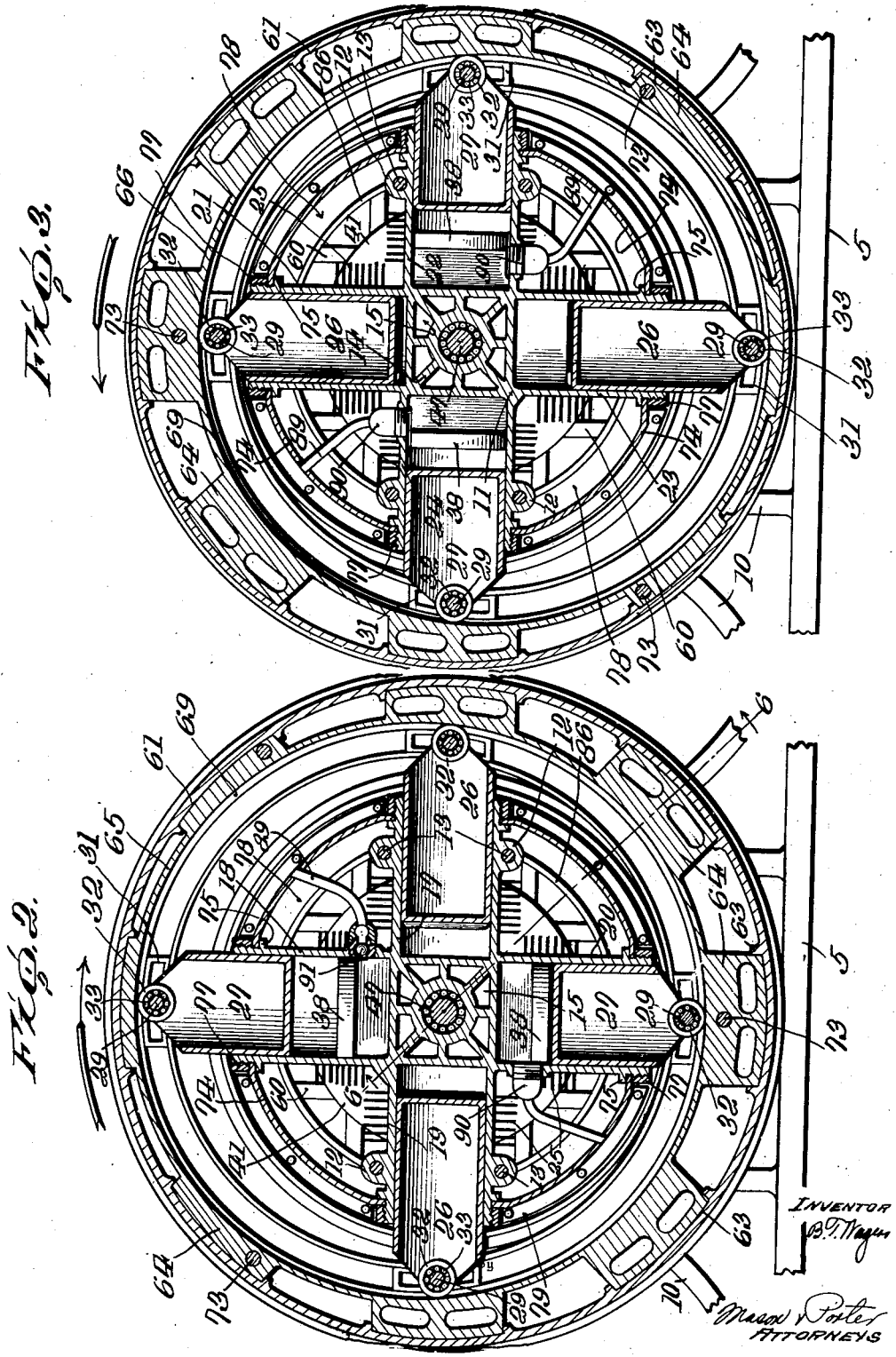

March 6, 1945. B. T. WAGERS 2,371,005
INTERNAL-COMBUSTION ENGINE
Filed Sept. 9, 1941 5 Sheets-Sheet 3
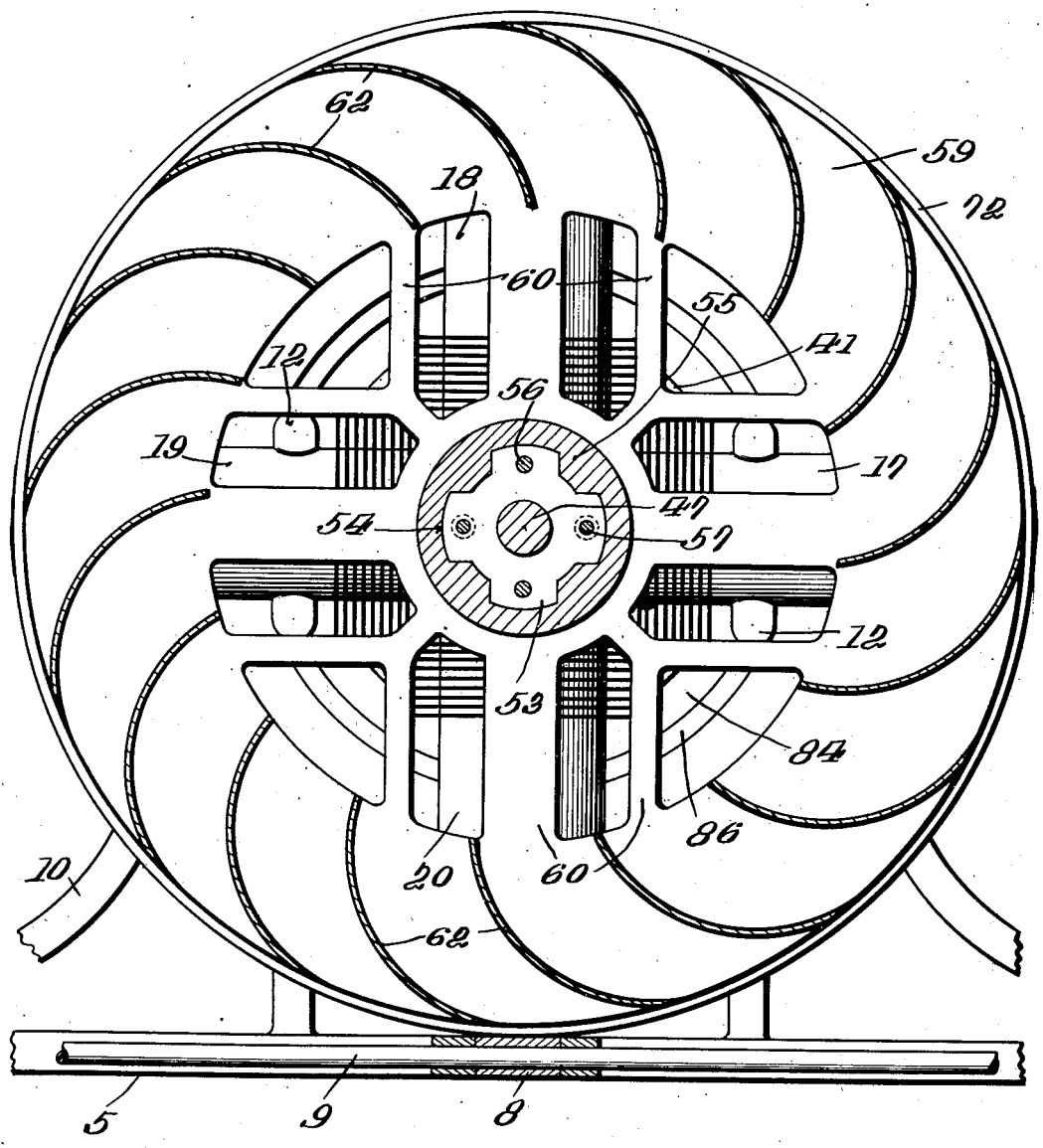

March 6, 1945.  B. T. WAGERS  2,371,005
INTERNAL-COMBUSTION ENGINE
Filed Sept. 9, 1941   5 Sheets-Sheet 4
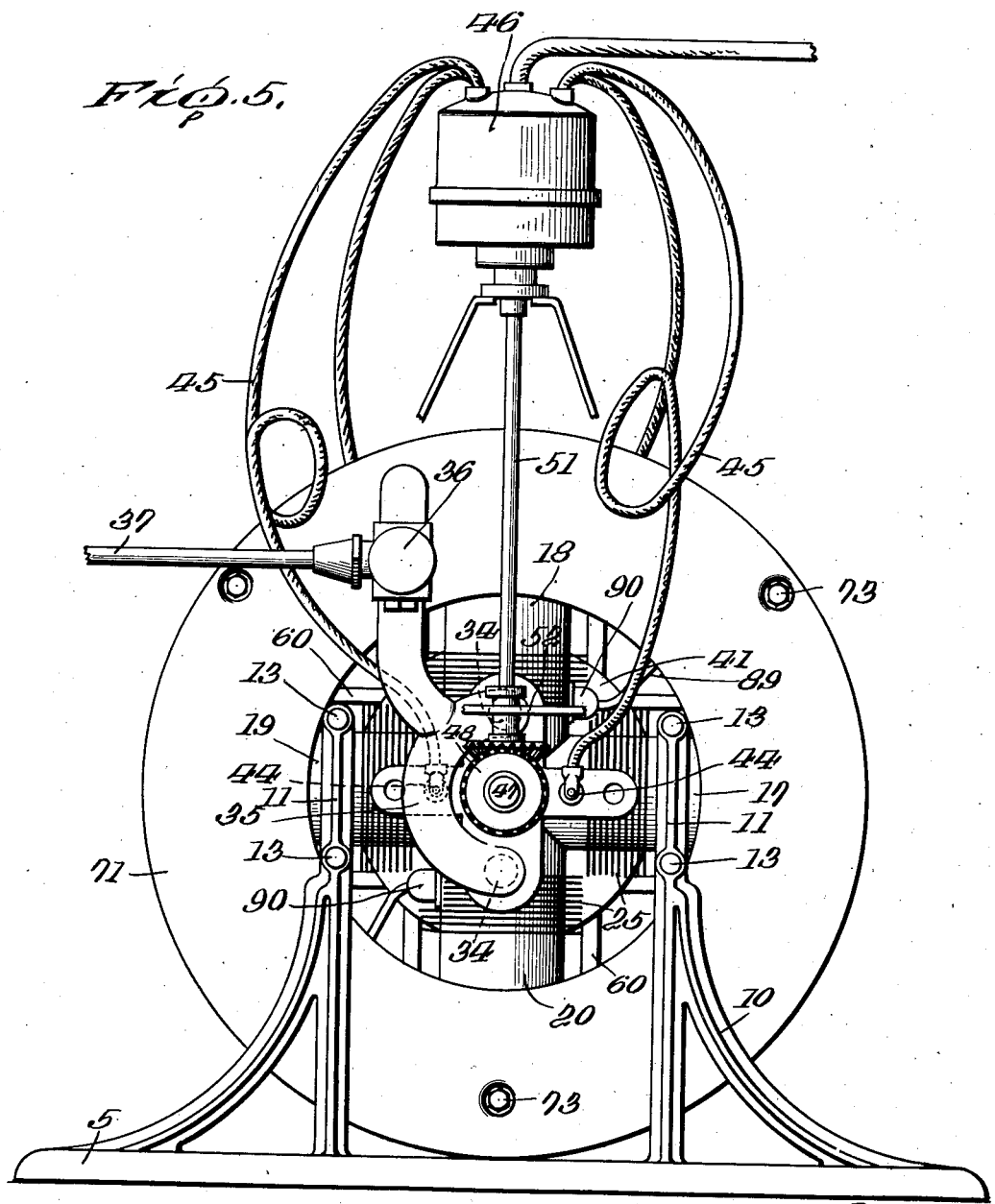

March 6, 1945.  B. T. WAGERS  2,371,005
INTERNAL-COMBUSTION ENGINE
Filed Sept. 9, 1941  5 Sheets-Sheet 5
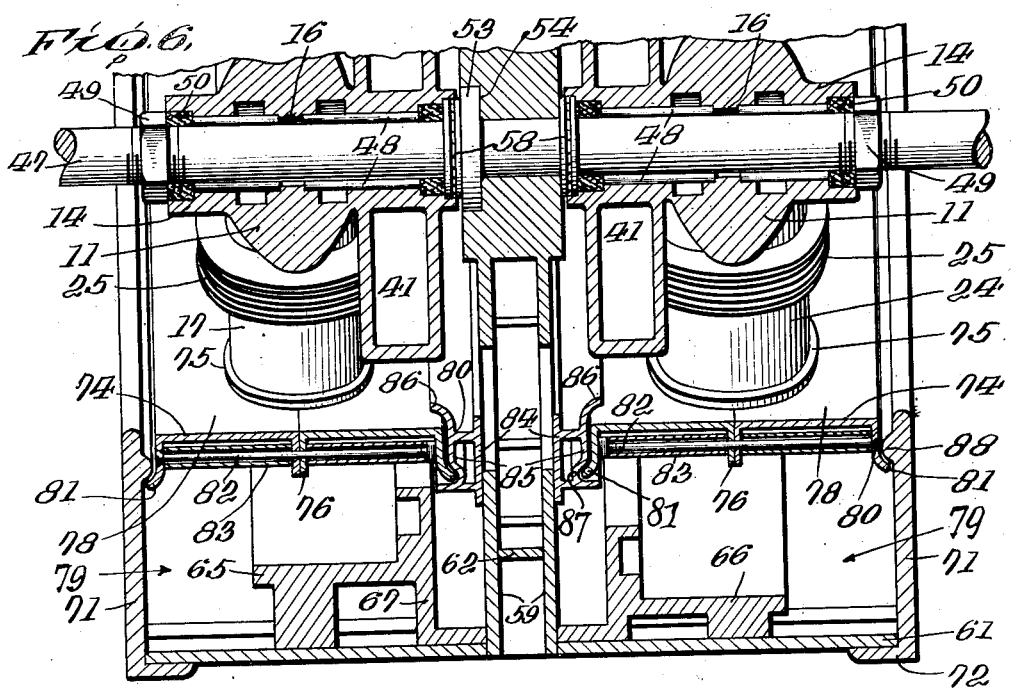
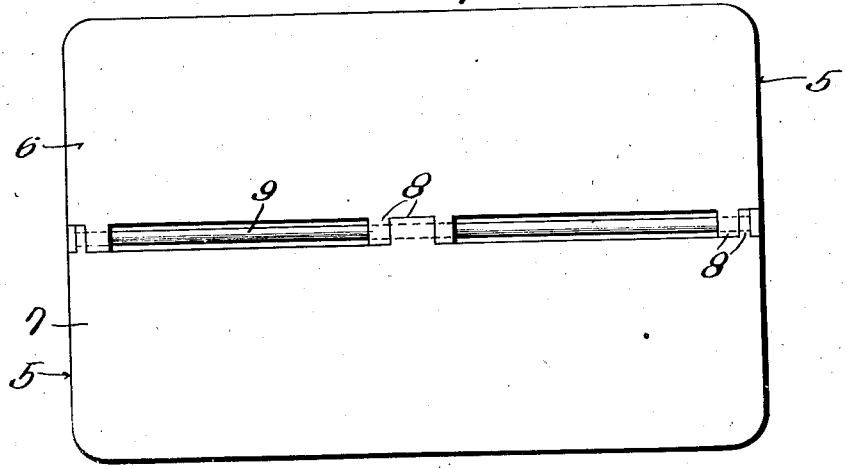
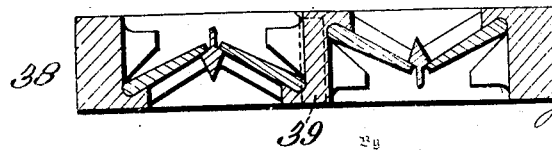
INVENTOR
Beverly T. Wagers
Mason & Porter
ATTORNEYS Patented Mar. 6, 1945

2,371,005

UNITED STATES PATENT OFFICE 2,371,005

INTERNAL-COMBUSTION ENGINE

Beverly T. Wagers, Irvine, Ky., assignor of one-fourth to J. M. Wolfinbarger, one-fourth to Charles Ball, and one-fourth to Eli Sparks, all of Irvine, Ky.

Application September 9, 1941, Serial No. 410,198

11 Claims. (Cl. 123—55)

The invention relates generally to engines of the expansible chamber type and more particularly seeks to provide certain new and useful improvements in an internal combustion engine such as is disclosed in U. S. Letters Patent 2,168,-502, issued to Beverly T. Wagers, on August 8, 1939.

An object of the invention is to provide an engine of the character stated in which the cylinders are arranged in two banks each including a plurality of combustion cylinders and a complementary plurality of compression cylinders effective to prepare charges for the combustion cylinders, and a flywheel structure common to both banks of cylinders and to which a succession of explosive impulses are imparted by pistons operating in the combustion cylinders for developing and distributing rotary motion.

Another object of the invention is to provide an engine structure of the character stated which is mounted upon a novel base structure composed of separable halves each of which supports one of the cylinder banks.

Another object of the invention is to provide an engine of the character stated including a novel flywheel structure composed of an outer sleeve which is concentric with the center of the cylinder blocks and the shaft passing therethrough and to which power is applied, and two inner rings or sleeves one associated with each of the cylinder banks and disposed eccentrically within the outer sleeve, each inner ring or sleeve having its point of maximum eccentricity disposed diametrically opposite the like point of the other eccentric ring or sleeve.

Another object of the invention is to provide an engine structure of the character stated in which the inner or eccentric ring or sleeve structures are slidable laterally out of the outer concentric sleeve with the cylinder banks.

Another object of the invention is to provide an engine of the character stated in which the cylinder banks have supply manifolds formed directly therein.

Another object of the invention is to provide an engine structure of the character stated in which the compression cylinders are larger than the combustion cylinders and force the prepared charge into the supply manifold in a manner for providing a supercharging effect in the operation of the engine.

Another object of the invention is to provide an engine of the character stated in which the flywheel includes spaced central wall portions which open through the periphery of the flywheel in a manner for causing air to be drawn in between the radially extended portions of the cylinder banks and forcibly ejected peripherally between said walls so as to provide for an efficient cooling of the engine.

Another object of the invention is to provide an engine of the character stated in which means is included for forming a lubricating chamber surrounding the radially extended portion of each cylinder bank and within the flywheel and effective to efficiently lubricate the power transmitting connections between the pistons and the flywheel.

Another object of the invention is to provide an engine of the character stated in which novel means is included for causing air functioning to aid in the cooling of the engine to forcibly pass into the lubricating chamber in a manner for assuring against leakage of lubricant therefrom.

Another object of the invention is to provide an engine of the character stated in which is included novel means for causing each pump or compression cylinder piston, on its outward stroke, to draw a quantity of air from the lubricant chamber, thereby to set up a breathing action in said lubricating chamber.

With the above and other objects in view which will more fully appear, the nature of the invention will be more clearly understood by following the description, the appended claims, and the several views illustrated in the accompanying drawings.

In the drawings:

Figure 1 is a central longitudinal section through the engine.

Figure 2 is a vertical cross section taken on the line 2—2 on Figure 1.

Figure 3 is a vertical cross section taken on the line 3—3 on Figure 1.

Figure 4 is a vertical cross section taken on the line 4—4 on Figure 1.

Figure 5 is a side elevation.

Figure 6 is a fragmentary cross section taken on the line 6—6 on Figure 2.

Figure 7 is an inverted plan view of the engine base.

Figure 8 is a detail cross sectional view of one of the compression cylinder valves.

The engine herein illustrated as an example of embodiment of the invention includes a base generally designated 5 and which is composed of two longitudinal half sections 6 and 7. The opposing edges of the half sections 6 and 7 are equipped with interfitting and bored lug equipments 8, and the half sections are secured in the assembled relation illustrated in Figure 7 by a removable bolt 9.

The base 5 is equipped with two standards 10, one thereof being extended uprightly from each of the half sections 6 and 7. Each standard 10 serves as a support for a cylinder block or bank generally designated 11. Each of the cylinder blocks 11 is equipped with mounting ears 12 for receiving bolts 13 passed therethrough and through bores in the respective standard for removably mounting the cylinder blocks or banks on the base half sections 6 and 7. See Figures 1 and 5 of the drawings.

Each cylinder block comprises a center hub 14 which is skeletonized, as at 15, as a cooling medium and also in order to reduce weight and is provided with a center bore 16. Each of the blocks is provided with four radially projecting, equidistantly spaced cylinders, two axially aligned cylinders being combustion cylinders and the other two axially aligned cylinders being compression cylinders.

It will be observed by reference to Figures 1, 2 and 3 of the drawings that each compression cylinder in a given block is disposed beside a combustion cylinder in the adjacent block, thus placing the combustion cylinders on quarters about the engine center, and the firing order follows this arrangement, namely, first in a combustion cylinder in a given block, then on the second quarter in the other block, then on the third quarter in the first mentioned block and then again on the fourth quarter in said other block, and so on. In this illustration the combustion cylinders in the respective cylinder banks are designated by odd numerals 17, 19, 21 and 23, and the compression cylinders are designated by even numerals 18, 20, 22 and 24. It will be noted also that the compression cylinders are of larger diameter than the combustion cylinders.

All of the cylinders 17 through 24 are equipped with cooling fins 25, and provision is made for efficiently air cooling the engine in a manner which will later become apparent.

A piston 26 is reciprocable in and projects radially beyond the end of each combustion cylinder, and a pump or charge compressing piston 27 is similarly mounted in each compression cylinder. All of the pistons have spaced bearings 28 at their radially projected ends, and in the spaced bearings of each piston is mounted a cross pin 29. The ends of each cross pin 29 are removably received in sockets 30 provided in arcuate cross heads 31, the purpose for which will become apparent as this description progresses. Between the spaced bearings 28 of each piston is mounted a roller 32. The roller surrounds the respective cross pin 29, and suitable anti-friction bearings 33 are interposed between each roller and the respective pin. The purpose of these rollers will also be described later.

An intake port 34 leads into each pump or compression cylinder from an intake manifold 35 which is common to all of the ports 34 in a given cylinder bank. It will be apparent that two such manifolds must be provided, one for each cylinder bank. Each intake manifold is supplied with a suitable air and gas mixture from a carbureter 36 which is in turn supplied with gas from a gas supply line 37.

A plate valve structure 38 is removably secured, as at 39, in each compression cylinder and acts as a double check valve allowing the drawing in of a fuel mixture charge on the outward stroke of the respective piston and then closing the cylinder against egress of the charge through the respective intake port 34 and causing said charge to be compressed in the respective cylinder and forced through said valve and the respective outlet port 40 into a supply manifold 41 integrally formed on the respective cylinder. As will be apparent from Figures 1, 2 and 3 of the drawings, each of the cylinder blocks is equipped with a supply manifold 41.

Each supply manifold 41 communicates through intake ports 42 with the combustion cylinders of the particular cylinder block, and opposite each intake port 42 each combustion cylinder is equipped with an exhaust port 43. The exhaust ports of each cylinder block may be directed into a suitable exhaust manifold or they may open directly to the atmosphere according to the demands of the particular engine installation.

A spark plug 44 is connected in each combustion cylinder, and all of the spark plugs are connected in the usual manner by leads 45 with a timer or distributer generally designated 46 and which may be of any approved construction. The timer is so connected with the spark plugs and driven in a manner later to be described that it will cause the plugs in the combustion cylinders to fire on successive quarters with successive firings occurring in alternate cylinder blocks, that is, first in the block at one side and next in the block at the opposite side.

A driven or power applying shaft 47 is rotatable in anti-friction bearings 48 in the hubs of the blocks 11, and this shaft is secured in place by threadably mounted nuts 49, suitable oil seal packing 50 being provided for retaining lubricant within the block hubs.

The distributer 46 may be driven from the shaft 47 by any suitable power transmitting connections such as the drive shaft 51 and the one-to-one bevel gear couple 52 with the shaft 47 as illustrated in Figures 1 and 5 of the drawings.

The shaft 47 is equipped with a non-circular plate or enlargement 53 which fits a non-circular receiving recess 54 in the hub 55 of the flywheel structure, suitable dowels 56 and securing bolts 57 serving to position and secure the assembly of the flywheel structure with the shaft. The flywheel hub 55 is opposed by anti-thrust bearings 58 which surround the shaft 47 between said hub and the adjacent ends of the cylinder blocks 11.

The flywheel structure is composed of the hub 55 and a pair of parallel spaced spoke plates 59 which are welded or otherwise secured to the hubs at their inner edges. The plates 59 are skeletonized, as at 60, in order to reduce weight and also to provide free circulation of air therethrough. At their outer edges the spoke plates 59 are secured to a flywheel ring or sleeve 61 which is disposed concentrically about the axis of the shaft 47 and the cylinder blocks 11. Between the outer edge portions of the laterally spaced spoke plates 59 are mounted a plurality of equidistantly spaced, arcuate air pumping vanes 62. It will be obvious that as the flywheel ring or sleeve 61 is rotated, air will be forcibly drawn into the space intervening the spoke plates 59 and will be expelled through the vanes 62 at the periphery of the flywheel, thus setting up a forced circulation of air about the radially projected cylinders.

At its inner surface, the flywheel ring or sleeve 61 is provided with a plurality of equidistantly spaced cross grooves 63, eight such grooves being provided in this particular disclosure. The cross grooves slidably receive lugs 64 projecting radially outwardly from two inner eccentric flywheel rings 65 and 66, one such ring surrounding the radially projected ends of the cylinders of each of the cylinder blocks 11 in the manner clearly illustrated in Figures 1, 2 and 3 of the drawings. Each of the rings 65 and 66 presents an inner cylindrical surface which is contacted by the piston rollers 32 of the respective cylinder bank, and this surface is disposed eccentrically with respect to the power shaft 47. It will also be noted by reference to Figures 1, 2 and 3 of the drawings that the point of maximum eccentricity of the ring 65 is disposed diametrically opposite the like point of the ring 66. The eccentric inner surfaces of the rings 65 and 66 bear a sort of inclined plane relation to the axes of the respective cylinders, and it will be obvious that each explosive impulse in a given combustion cylinder, by reason of the outward pressure of the particular piston against the relatively inclined surface of the ring 65 or 66, will serve to impart rotary motion to the whole flywheel and the power shaft 47 rotatable therewith.

In order to fix the eccentric relation of the rings 65 and 66 within the flywheel sleeve 61, and to secure these parts in rigid assembly relation, each of the rings 65 and 66 is formed to include a wall 67 disposed in a plane parallel the adjacent spoke plate 59 and including a flange extension 68 which abuts said adjacent plate in the manner best illustrated in Figure 1 of the drawings. Each wall 67 is provided with an annular groove 69 disposed concentrically with, or, in other words, following the eccentricity of the ring proper 65 or 66. Each groove 69 is opposed by a like groove 70 in a wall ring 71 having a peripheral flange 72 for snugly fitting over the respective side edge of the flywheel sleeve 61 in the manner illustrated in Figure 1. The opposed grooves 69 and 70 receive the cross heads 31 and cooperate with the eccentric surfaces of the rings 65 and 66 and the engagement of the piston rollers 32 therewith in causing the various pistons to reciprocate radially in the cylinders in which they are mounted. Each ring 65 or 66 is held in rigid assembly relation with the flywheel sleeve 61 and the respective wall ring 71 by a plurality of equidistantly spaced bolts 73, and the flywheel structure thus secured in rigid assembly relation in statically and dynamically balanced.

Ring sections 74, recessed to embrace the cylinders of the respective cylinder bank, are disposed outwardly of and against abutment flanges 75 provided on the cylinders. These sections are flange-secured together, as at 76, and are secured against the cylinder flanges 75 by nuts 77 threaded on the radially extended ends of the cylinders. Each set of ring sections 74 forms an air chamber 78 within the composite ring or casing portion formed by these sections and surrounding the radially projected cylinders of the particular cylinder bank. Similarly, an oil chamber 79 is formed outwardly of the ring sections 74 and between the parallel wall flanges 80 which are welded or otherwise secured to project outwardly from the lateral edges of said ring sections. The wall flanges 80 terminate in outwardly or generally horizontally directed edges 81 and these wall flanges are secured in rigid spaced relation by screws 82 passing through spacer sleeves 83. It will be observed by reference to Figure 1 of the drawings that each chamber 79 is defined by the respective set of ring sections 74, the wall flanges 80, the flywheel sleeves 61, and the lateral walls 59 and 71. These oil chambers are additionally defined by sealing ring or flange equipments now to be described.

A sealing ring 84 is secured in any approved manner to the outer face of each spoke plate 59 and in the manner best illustrated in Figure 1, and each ring 84 includes a wall portion 85 disposed in closely spaced relation to the adjacent wall flange 80, and an inwardly and outwardly curved air scoop flange extension 86, and an inwardly directed receiving recess 87 for closely fitting about the wall flange edge portion 81. Each wall ring 71 also includes a flange 88 disposed to closely oppose the adjacent wall flange edge portion 81, thus completing the oil confining chamber 79.

Two breather tubes 89 extend through the ring sections 74 into the oil chamber 79, and each of these tubes is connected at its outer end with one of the pump cylinders through a removable coupling 90 including a check valve 91. It will be apparent that as each piston in a compression cylinder moves on its outward stroke it will draw air into the cylinder from the oil chamber and through the respective breather tube 89, thereby setting up a breather action in the oil chamber. The check valve 91 will, of course, prevent forced delivery of air into the oil chamber.

During the operation of the invention, each outward stroke of a compression piston will draw a charge of fuel and air mixture into the respective cylinder through the inner port 34. On its inward stroke this piston will compress the fuel mixture thus drawn into the cylinder and forcibly expel it through the respective outlet port 40 into the supply manifold 41. As the piston in each combustion chamber uncovers the respective intake port 42, it will permit entry of a supercharged fuel charge into the respective cylinder. It will be understood, of course, that while this combustion cylinder piston is at the outer limit of its stroke the cylinder will be scavenged through the exhaust port 43. On the inward stroke, this piston will first close the intake port 42 and then compress the fuel charge, and when the piston has reached the limit of its inward stroke the respective spark plug will ignite the charge and the resultant explosion will act to force the piston outwardly and cause roller 32 to engage and impart a forward rotary impulse to the flywheel. This cycle of the combustion cylinder and piston complements is repeated at quarters about the circumference of the flywheel thereby to impart a succession of rotation imparting impulses from the combustion cylinder pistons to the flywheel, the order of firing being as previously described on quarters with successive firings occurring in alternate cylinder banks, that is, first in one bank and then in the next.

It will be apparent that when the flywheel structure is being rapidly rotated, air will be forcibly drawn in between the radially projected cylinders, into the space intervening the spoke plates 59, and forcibly expelled through the periphery of the flywheel structure through the arcuate impeller vanes 62.

The scoop flange portions 86 serve to intercept the rapidly moving cylinder cooling air and to direct it into the very narrow space intervening the oil sealing wall portions 80 and 85. Air forced outwardly between these wall portions 80 and 85 by centrifugal force will serve effectively to overcome any tendency toward leakage of lubricant through the narrow space intervening said wall portions. In the same manner, air forced outwardly by centrifugal force will tend to prevent any leakage of lubricant between the wall or flange portions 81 and 85.

The engine herein described is very simple in construction and can be assembled and disassembled with great facility. If desired, the base bolt 9 can be removed and one of the base halves 6 or 7 moved laterally away from the companion half, assuming, of course, that the shaft nut 49 has first been removed. By the simple removability of the single bolt 9 and the respective nut 49, the whole cylinder bank at the respective side of the engine can be removed, the respective ring 65 or 66 readily sliding outwardly through the mounting grooves 63 in the flywheel sleeve 61. If it is desired to remove other parts of the cylinder block assembly, it is only necessary to remove the three bolts 73 by which the respective ring 65 or 66 and the wall ring 71 are secured in rigid assembly relation. By separating the ring 65 or 66 from the respective wall ring 71, the individual pistons, cross pins 29, rollers 32, and yokes 31 can be readily dismounted.

It is of course to be understood that the details of structure and arrangement of parts may be variously changed and modified without departing from the spirit and scope of the invention.

I claim:

1. In an engine of the character described, two separate banks of cylinders and pistons projecting radially from and reciprocable in said cylinders, a shaft, and power transmitting connections between the pistons and said shaft including a flywheel composed of an outer ring concentric with the shaft and surrounding both cylinder banks and two inner rings disposed eccentrically about the shaft and each surrounding one cylinder bank, each said inner ring and the cylinder bank which it surrounds being withdrawable as a unit from the respective end of the outer ring.

2. In an engine of the character described, two separate banks of cylinders and pistons projecting radially from and reciprocable in said cylinders, a shaft, and power transmitting connections between the pistons and said shaft including a flywheel surrounding both cylinder banks and having two circular eccentric inner surfaces one surrounding and opposing the pistons of each cylinder bank, a frame composed of separable base halves and a standard rising from each half beside one cylinder bank, means removably connecting the base halves, and means removably securing each cylinder bank to the respective half standard whereby the base halves can be separated to remove one or the other of the cylinder banks from the engine and each cylinder bank can be removed from its supporting standard.

3. An engine as defined in claim 2 in which the flywheel comprises an outer ring concentric with the shaft and in which each said eccentric inner surface is formed in an inner ring which is separable with the respective cylinder bank from said outer ring.

4. An engine as defined in claim 1 in which the point of maximum eccentricity of each inner ring is disposed diametrically opposite the like point of the other inner ring and in which the outer ring is equipped with longitudinal grooves and the inner rings with radially projected ribs slidable in said grooves and serving to definitely yet removably place said rings.

5. An engine as defined in claim 2 in which the flywheel comprises an outer ring concentric with the shaft and each said eccentric inner surface is formed in an inner ring which is separable with the respective cylinder bank from said outer ring, in which the point of maximum eccentricity of each inner ring is disposed diametrically opposite the like point of the other inner ring, and in which the outer ring is equipped with longitudinal grooves and the inner rings with radially projected ribs slidable in said grooves and serving to definitely yet removably place said rings.

6. An engine as defined in claim 1 in which the flywheel includes a central hub fixed to the shaft, in which an anti-thrust bearing is interposed between the hub and each cylinder bank, and in which a single removable nut serves to secure each cylinder bank on the shaft and against the respective bearing.

7. An engine as defined in claim 1 in which the flywheel includes a central hub fixed to the shaft, in which an anti-thrust bearing is interposed between the hub and each cylinder bank, and in which a plurality of removable bolts secure the assembly of each inner ring and the cylinder bank which it surrounds with said outer ring.

8. In an engine of the character described, a flywheel having an internal circular eccentric surface disposed at each side of its central transverse plane with the point of maximum eccentricity of the eccentric surfaces spaced circumferentially 180° apart, said flywheel also including a pair of skeletonized spoke plates spaced apart to provide a central air flow space therebetween and peripheral openings for centrifugal expulsion of air, and impeller vanes between said plates for inducing air currents endwise inwardly through the spoke plates and outwardly through said peripheral openings.

9. A lubricant chamber providing flywheel structure for engines of the type wherein are included two separate banks of cylinders and pistons projecting radially from and reciprocable in said cylinders, a shaft, and power transmitting connections between the pistons and said shaft; said flywheel including an annular portion surrounding both cylinder banks and having two circular eccentric inner surfaces one surrounding and opposing the pistons of each cylinder bank and annular solid inner wall portions adjacent said annular portion, an annular wall ring secured to each side of the flywheel and opposing one of the wall portions to provide therewith and with the flywheel an annular lubricant chamber, and means carried by each cylinder bank to complete the respective surrounding lubricant chamber.

10. A lubricant chamber providing flywheel structure for engines of the type wherein are included two separate banks of cylinders and pistons projecting radially from and reciprocable in said cylinders, a shaft, and power transmitting connections between the pistons and said shaft; said flywheel including a pair of skeletonized spoke plates spaced apart to provide a central air flow space therebetween and peripheral openings for centrifugal expulsion of air, and impeller vanes between said plates for inducing air currents inwardly through the cylinder banks and outwardly through the peripheral openings, said plates being solid adjacent the peripheral edges to provide solid annular wall portions, an annular wall ring secured to each side of the flywheel and opposing the respective annular wall portion to provide therewith and with the flywheel an annular lubricant chamber, and means carried by each cylinder bank to complete the surrounding lubricant chamber, said last named means comprising an annular ring structure having edge portions lying very close to the respective annular wall portion and annular wall ring so as to provide very narrow passages through which air will be thrown by centrifugal force into the respective lubricant chamber so as to prevent leakage of lubricant inwardly through said passages.

11. A lubricant chamber providing flywheel structure for engines of the type wherein are included two separate banks of cylinders and pistons projecting radially from and reciprocable in said cylinders, a shaft, and power transmitting connections between the pistons and said shaft; said flywheel including a pair of skeletionized spoke plates spaced apart to provide a central air flow space therebetween and peripheral openings for centrifugal expulsion of air, and impeller vanes between said plates for inducing air currents inwardly through the cylinder banks and outwardly through the peripheral openings, said plates being solid adjacent the peripheral edges to provide solid annular wall portions, an annular wall ring secured to each side of the flywheel and opposing the respective annular wall portion to provide therewith and with the flywheel an annular lubricant chamber, and means carried by each cylinder bank to complete the surrounding lubricant chamber, said last named means comprising an annular ring structure composed of half sections flange-secured together with semi-circular recesses therein surrounding the cylinders adjacent the ends thereof and having edge portions lying very close to the respective annular wall portion and annular wall ring so as to provide very narrow passages through which air will be thrown by centrifugal force into the respective lubricant chamber so as to prevent leakage of lubricant inwardly through said passages.

BEVERLY T. WAGERS.